(12) United States Patent
Cai (10) Patent No.: US 8,059,625 B2
(45) Date of Patent: Nov. 15, 2011

(54) DISTRIBUTED ARCHITECTURE AND METHODS FOR BROADCAST/MULTICAST SERVICE

(75) Inventor: Zhijun Cai, N. Richland Hills, TX (US)

(73) Assignee: Motorola Mobility, Inc., Libertyville, IL (US)

( * ) Notice: Subject to any disclaimer, the term of this patent is extended or adjusted under 35 U.S.C. 154(b) by 665 days.

(21) Appl. No.: 11/347,650

(22) Filed: Feb. 3, 2006

(65) Prior Publication Data

US 2007/0183358 A1 Aug. 9, 2007

(51) Int. Cl.
*H04W 4/00* (2009.01)

(52) U.S. Cl. .......................... 370/341; 455/450; 455/464

(58) Field of Classification Search .......... 370/328–330, 370/437, 431, 474, 468, 252, 254, 338; 455/450–452.2; 709/223–226
See application file for complete search history.

(56) References Cited

U.S. PATENT DOCUMENTS

| 6,731,639 | B1 | 5/2004 | Ors et al. | |
|---|---|---|---|---|
| 2003/0021240 | A1* | 1/2003 | Moon et al. | 370/320 |
| 2004/0131026 | A1* | 7/2004 | Kim et al. | 370/328 |
| 2004/0223513 | A1 | 11/2004 | Meago | |
| 2005/0030966 | A1 | 2/2005 | Cai et al. | |
| 2005/0043035 | A1 | 2/2005 | Diesen et al. | |
| 2005/0135291 | A1 | 6/2005 | Ketchum et al. | |
| 2005/0193309 | A1* | 9/2005 | Grilli et al. | 714/752 |
| 2005/0237972 | A1* | 10/2005 | Van Dervelde et al. | 370/329 |
| 2007/0142067 | A1* | 6/2007 | Cheng et al. | 455/512 |

FOREIGN PATENT DOCUMENTS

WO WO 2005125250 A1 * 12/2005

OTHER PUBLICATIONS

"Intro. of the Multimedia Broadcast Multicast Service (MBMS) in the Radio Access Network (RAN)," 3rd. Gen. Partnership Proj. (3GPP); Tech. Spec. Group Radio Access Network; Stage 2 (Rel. 6), 3GPP TS 25.346 v6.7.0 (Dec. 2005).

"Multimedia Broadcast/Multicast Service (MBMS); Architecture and functional description," 3rd. Gen. Partnership Proj.; Tech. Spec. Group Services and Systems Aspects; (Rel. 6), 3GPP TS 25.246 v6.9.0 (Dec. 2005).

Nortel, "Nortel Vision on Access Network Evolution, Nortel," 3rd. Gen. Partnership Proj. (3GPP); Tech. Spec. Change Request, R2-051753 (Jun. 2005).

Motorola, "Motorola's proposal for UTRAN evolution," 3GPP Tech. Spec. Change Request R2-051749 (Jun. 2005).

(Continued)

*Primary Examiner* — Rafael Pérez-Gutiérrez
*Assistant Examiner* — Marcos Batista
(74) *Attorney, Agent, or Firm* — Vedder Price P.C.

(57) ABSTRACT

A distributed architecture and method for MBMS delivery is disclosed. The various embodiments enable selection combining and soft combining by UEs for MBMS transmissions. An MBMS service notification (509) is sent to all E-Nodes (503). The E-Nodes proceed to request counting (511) from the UEs (501). A transmission request (513) is then sent to the anchor MBMS-Transmission Control Function (TCF) (505) from the E-Nodes (503). The anchor MBMS-TCF (505) generates resource allocation and scheduling profiles and segmentation and reassembly (SAR) profiles for the E-Nodes and sends the profiles (515) to the E-Nodes. The E-Nodes (503) use the profiles for resource allocation and configuration (517) and transmit MBMS data (519) in accordance with the profiles. The anchor MBMS-TCF (505) may then coordinate.

11 Claims, 8 Drawing Sheets

OTHER PUBLICATIONS

Nokia, "Long Term Evolution of radio link layer," 3GPP Tech. Spec. Change Request R2-051734 (Jun. 2005).

Qualcomm, "Protocol architecture for evolved UTRAN," 3GPP Tech. Spec. Change Request R2-051752 (Jun. 2005).

NTT DoCoMo, "Evolution of the radio interface protocol architecture," 3GPP Tech. Spec. Change Request R2-051738 (Jun. 2005).

Lucent Technologies, "Protocol Considerations for LTE," 3GPP Tech. Spec. Change Request R2-051736 (Jun. 2005).

Qualcomm, "L2 based serving cell selection for HSDPA," 3GPP Tech. Spec. Change Request R2-050548 (Feb. 2005).

Qualcomm, "Out-of-sequence reception support in RLC-UM," 3GPP Tech. Spec. Change Request R2-051451 (May 2005).

"Radio Resource Control (RRC); Protocol Spec.," 3rd. Gen. Partnership Proj. (3GPP); Tech. Spec. Group Radio Access Network; (Rel. 6), 3GPP TS 25.331 v6.8.0 (Dec. 2005).

"Medium Access Control (MAC) Standard for cdma2000 Spread Spectrum Systems, Release D," 3GPP2 C.S0003-D Version 2.0 (Sep. 2005).

Qualcomm, "Recommendation to review and adopt basis for BCMCS system design," WG3 Conf. Call C30-20030930-060 (Sep. 30, 2003).

Chinese Office Action; Chinese Application No. 200780004223.3; dated Apr. 20, 2011.

International Search Report and Written Opinion from US Patent Office; International Application No. PCT/US07/61178; dated Oct. 26, 2007.

\* cited by examiner

DISTRIBUTED ARCHITECTURE AND METHODS FOR BROADCAST/MULTICAST SERVICE

FIELD OF THE DISCLOSURE

The present disclosure relates generally to communication networks providing multimedia broadcast multicast service, and more particularly to methods and apparatus for providing and receiving multimedia broadcast multicast services within a communication network coverage area.

BACKGROUND

The localized multicast approach reduces expended network resources by limiting transmissions to a geographic area defined by the radio coverage area of a base transceiver station or even smaller areas as defined by antenna coverage sectors of the base transceiver station. Multicast services in general are described in various standards such as the Third Generation Partnership Project (3GPP), Universal Mobile Telephone System (UMTS) standards.

Localized multicast is likewise generally described in the UMTS standards. The UMTS standards, Release 6, define in general, architectures and methods of operation such as a counting procedure for Multimedia Broadcast, Multicast Service (MBMS) whereby the network learns the status of mobile devices in each cell and configures Radio Bearers (RBs) based upon the learned status information.

Two modes of operation are employed in the standards, namely, Point-to-Point (PTP) and Point-to-Multipoint (PTM). Under counting procedures, coverage areas having less than a preset number of users, employ PTP operation which requires setup of RBs individually per user. Conversely, coverage areas having at least the preset number of users will employ PTM for MBMS delivery wherein individual RBs are not required.

For MBMS delivery using PTM, it is desirable for mobile stations, also referred to as "User Equipment" (UEs), to employ macro-diversity, that is, to employ selection combining or soft combining of multiple signal transmissions.

In the case of selection combining, the "Protocol Data Units" (PDUs) from two, or more than two, cells should be generated in the same manner, although they need not be transmitted simultaneously. For soft combining, the PDUs from two cells should likewise be generated in the same manner and also should be transmitted simultaneously.

However, the current Enhanced Universal Terrestrial Radio Access Network (UTRAN) architecture incorporates cells ("Base Transceiver Stations" (BTS) or "Node Bs"), which provide scheduling and segmentation and reassembly (SAR) functions independently of any central point of control. Such architecture does not account for the UE's need to employ macro-diversity for MBMS PTM as discussed above.

DETAILED DESCRIPTION

Methods and apparatuses for providing a distributed architecture for MBMS delivery are provided herein.

Figure 1:
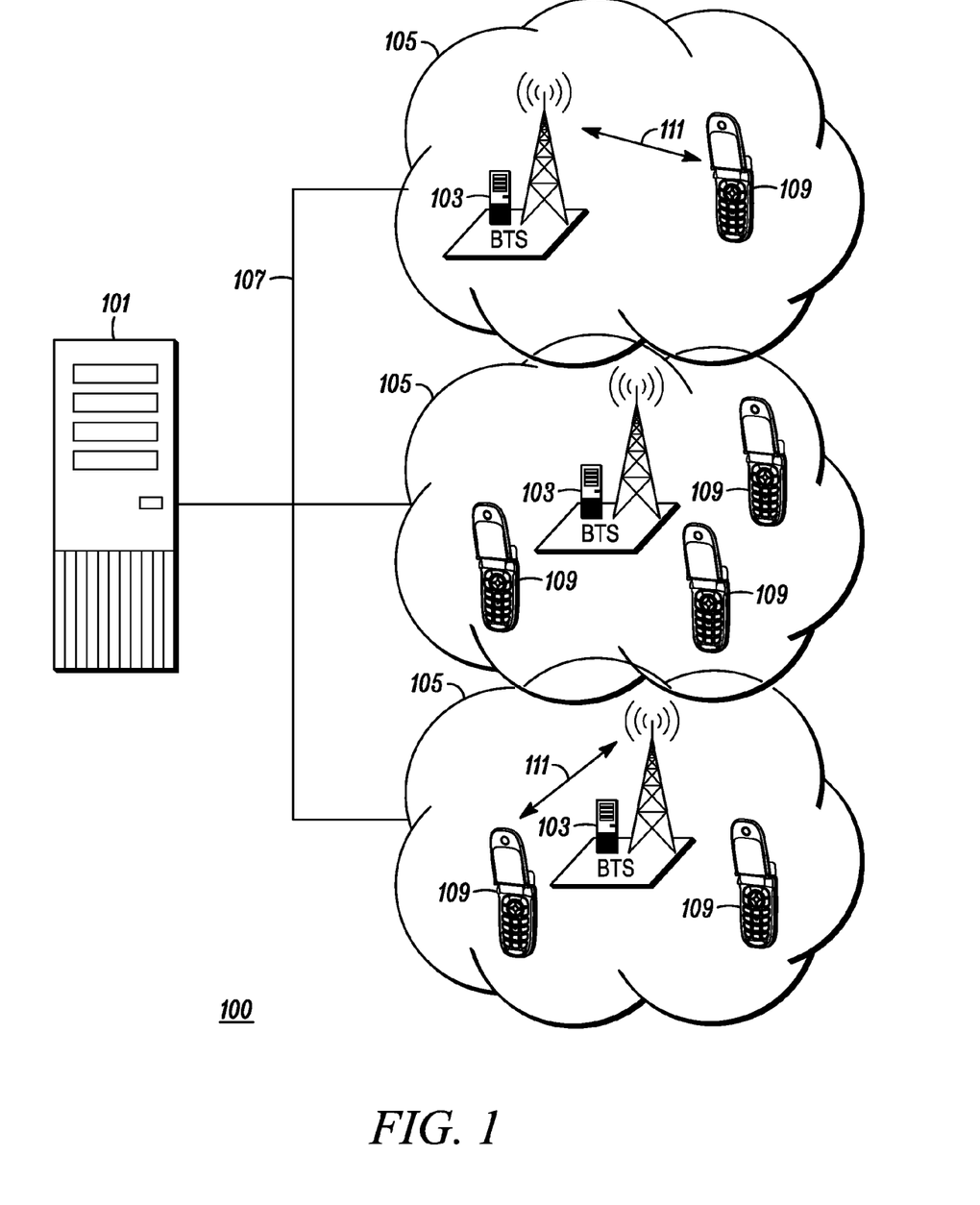
FIG. 1 is a diagram illustrating an exemplary communications network having various coverage areas with mobile stations located therein.

Turning now to the drawings wherein like numerals represent like components, FIG. 1 illustrates a communications network 100, with various base stations 103, each base station 103 having a corresponding coverage area 105. In general, base station coverage areas may overlap and, in general, form an overall network coverage area. An MBMS coverage area may comprise a number of base station coverage areas 105, which may form a contiguous radio coverage area. However, it is not required to have contiguous MBMS coverage and therefore the MBMS coverage area may alternatively be distributed throughout an overall network coverage area. Furthermore, each coverage area may have a number of mobile stations or UEs 109. A number of bases stations 103 will be connected to a base station controller 101 via backhaul connections 107. The base station controller and base stations form a Radio Access Network (RAN). The overall network may comprise any number of base station controllers, each controlling a number of base stations. Note that the base station controller 101 may alternatively be implemented as a distributed function among the base stations.

The base stations 103 may communicate with the mobile stations 109 via any number of standard air interfaces and using any number of modulation and coding schemes. For example, E-UMTS or CDMA2000 may be employed. Further, E-UMTS may employ Orthogonal Frequency Division Multiplexing (OFDM) and CDMA2000 may employ orthogonal spreading codes such as the Walsh codes. Semi-orthogonal spreading codes may also be utilized to achieve additional channelization over the air interface.

Figure 2:
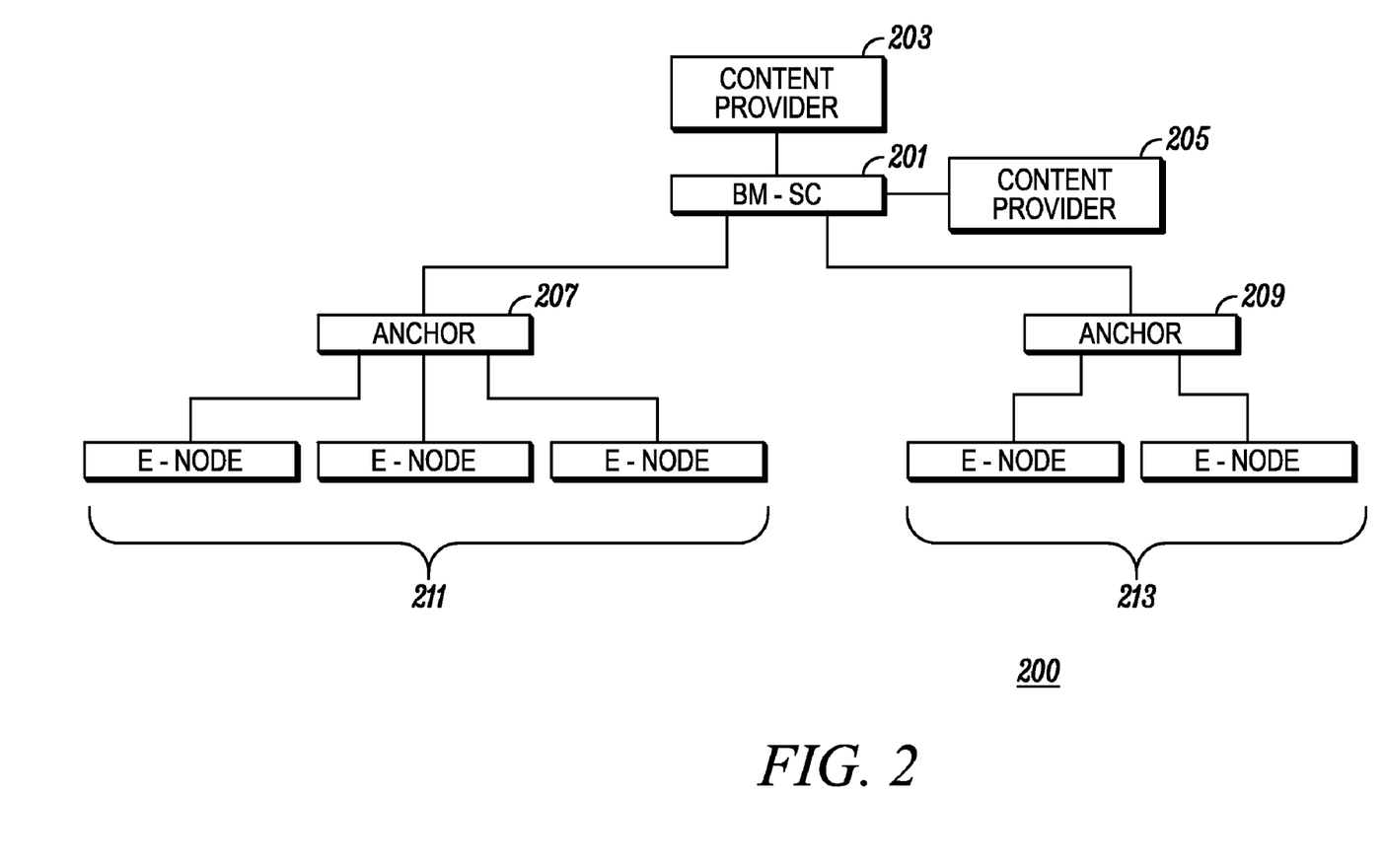
FIG. 2 is a diagram illustrating a high-level architecture in an Enhanced Multimedia Broadcast Multicast Service network.

FIG. 2 represents the general architecture of an Enhanced Multimedia Broadcast Multicast Service (MBMS) network. Each E-node 211, 213 corresponds to a base transceiver station, and is alternatively referred to as a cell. Also, the network 200 illustrated in FIG. 2 will have a number of control points, referred to herein as anchors, such as anchor 207 and anchor 209, each of which may be connected to any number of E-nodes.

Typically, an anchor will control a number of cells over a contiguous radio coverage area although such a schema is not required. Returning to FIG. 2, each E-node may have a number of mobile devices within its respective radio coverage area. In some embodiments, the Broadcast Multicast Service Center (BM-SC) provides functions for MBMS user service provisioning and delivery. The BM-SC may also serve as an entry point for content provider 203, 205 MBMS transmissions, may authorize and initiate MBMS Bearer Services within the Public Land Mobile Network (PLMN) and may schedule and deliver MBMS transmissions in some embodiments.

If a Radio Link Control (RLC) function and Medium Access Control (MAC) function reside the E-nodes 211,213, a centralized Radio Resource Management (RRM) function is required to synchronize the scheduling and seginentation and reassembly (SAR) functions as well as to coordinate the RLC and MAC functions between the various E-Nodes.

Assuming that a number of mobile stations within an E-node radio coverage area are configured to receive an MBMS service ("subscribed to MBMS"), then each mobile station will receive the MBMS data via PTM. The cells that have no mobile devices subscribed to MBMS, may not establish a PTM RB.

It is to be understood that cells that do not have mobile stations subscribed to MBMS may still have mobile stations present with their respective radio coverage areas. Note that the radio coverage areas represented by FIG. 1 shows that radio coverage areas or cells 105 may overlap. Therefore, mobile stations are capable of communicating with, or receiving data from, several cells having overlapping areas. Therefore, mobile stations may receive transmissions from more than one cell and combine the transmissions. FIG. 2 also illustrates the concept of the "best server," that is, the cell providing the mobile station with the best coverage at that particular time. The best server may be determined by any number of parameters such as signal-to-noise-and-interference ratio (SINR), bit error rate (BER), frame erasure rate (FER), or any other indicator, combination of indicators, or an indicator output from an algorithm using any one or more of the indicators as an input, all being understood by one of ordinary skill in the art. Therefore, a mobile station may receive a counting request from its best server cell in which case the mobile station may join the counting procedure by responding to the best server E-node.

Therefore, returning to FIG. 1, a mobile station 109 may leave a cell having a PTM RB and move to a cell which previously did not have a PTM RB established. In this case, the mobile station may initiate PTM setup on the new best server cell.

Figure 3:
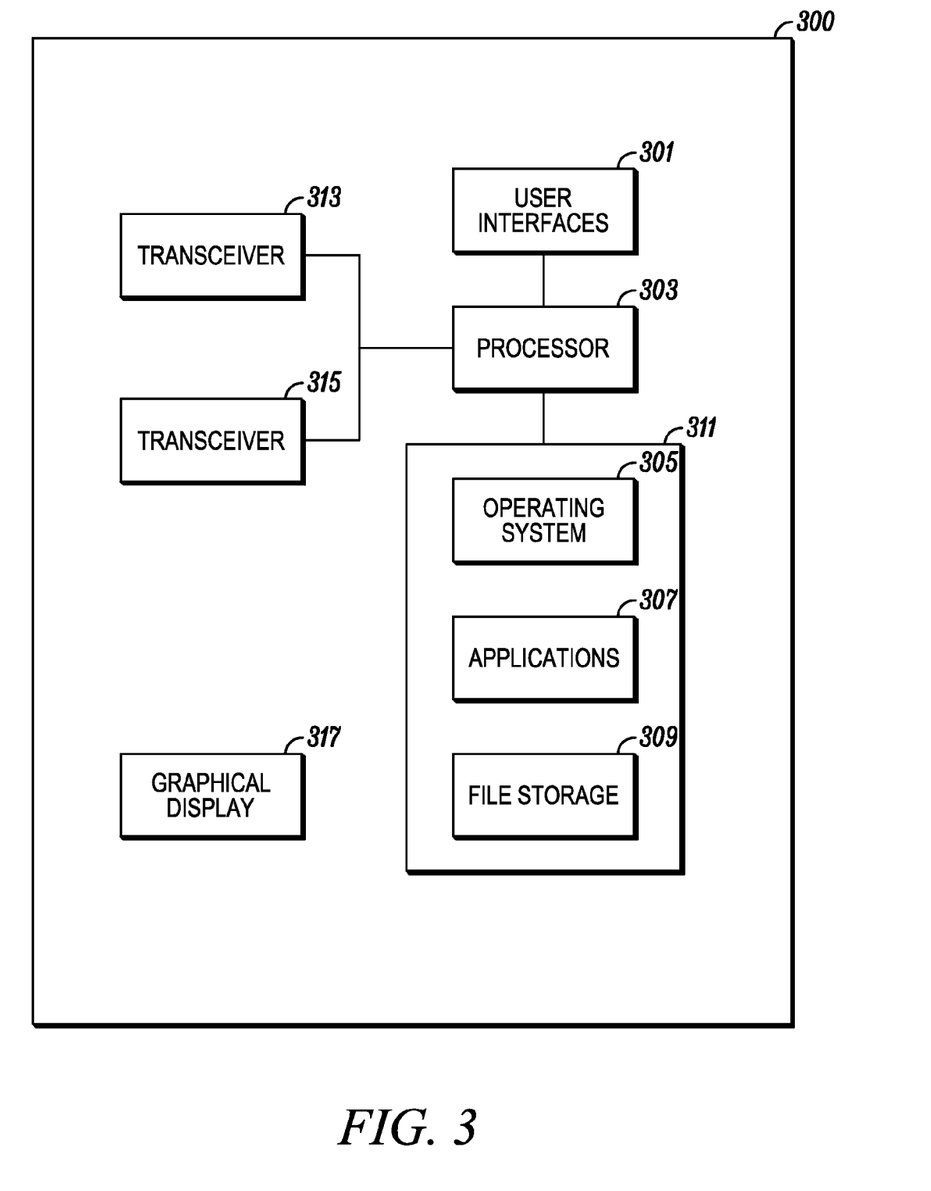
FIG. 3 is a block diagram of a mobile station in accordance with some embodiments.

FIG. 3 is a block diagram illustrating the primary components of a mobile station in accordance with some embodiments. Mobile station 300 comprises user interfaces 301, at least one processor 303, and at least one memory 311. Memory 311 has storage sufficient for the mobile station operating system 305, applications 307 and general file storage 309. Mobile station 300 user interfaces 301, may be a combination of user interfaces including but not limited to a keypad, touch screen, voice activated command input, and gyroscopic cursor controls. Mobile station 300 has a graphical display 317, which may also have a dedicated processor and/or memory, drivers etc. which are not shown in FIG. 3.

It is to be understood that FIG. 3 is for illustrative purposes only and is for illustrating the main components of a mobile station in accordance with the present disclosure, and is not intended to be a complete schematic diagram of the various components and connections therebetween required for a mobile station. Therefore, a mobile station may comprise various other components not shown in FIG. 3 and still be within the scope of the present disclosure.

Returning to FIG. 3, the mobile station 300 may also comprise a number of transceivers such as transceivers 313 and 315. Transceivers 313 and 315 may be for communicating with various wireless networks using various standards such as, but not limited to, UMTS, CDMA2000, 802.11, 802.16, etc.

Memory 311 is for illustrative purposes only and may be configured in a variety of ways and still remain within the scope of the present disclosure. For example, memory 311 may be comprised of several elements each coupled to the processor 303. Further, separate processors and memory elements may be dedicated to specific tasks such as rendering graphical images upon a graphical display. In any case, the memory 311 will have at least the functions of providing storage for an operating system 305, applications 307 and general file storage 309 for mobile station 300. In some embodiments, applications 307 may comprise a software stack that communicates with a stack in the E-node.

Figure 4:
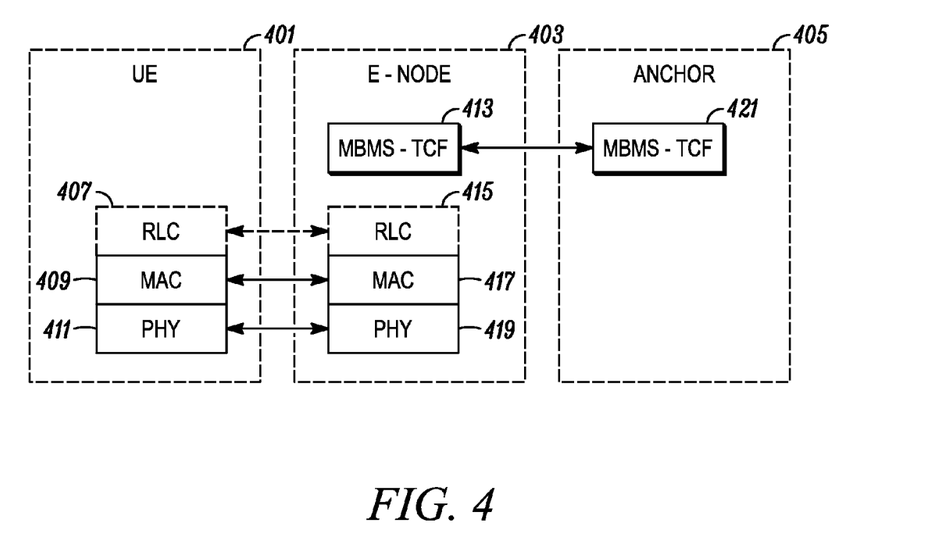
FIG. 4 is a block diagram of protocol architecture for a mobile station, a base transceiver station and an anchor in accordance with the embodiments.

Turning now to FIG. 4, mobile station, E-node, and anchor architectures in accordance with the various embodiments are illustrated. Mobile stations, or User Equipment (UE) 401 comprises a stack having a Radio Link Controller (RLC) 407, a Medium Access Controller (MAC) 409, and a Physical Layer (PHY) 411.

E-Node 403 similarly has an RLC 415, MAC 417 and PHY 419. However, E-Node 403 additionally in the various embodiments has MBMS Transmission Control Function (TCF) 413. Likewise, anchor 405 has an MBMS-TCF 421.

Figure 5:
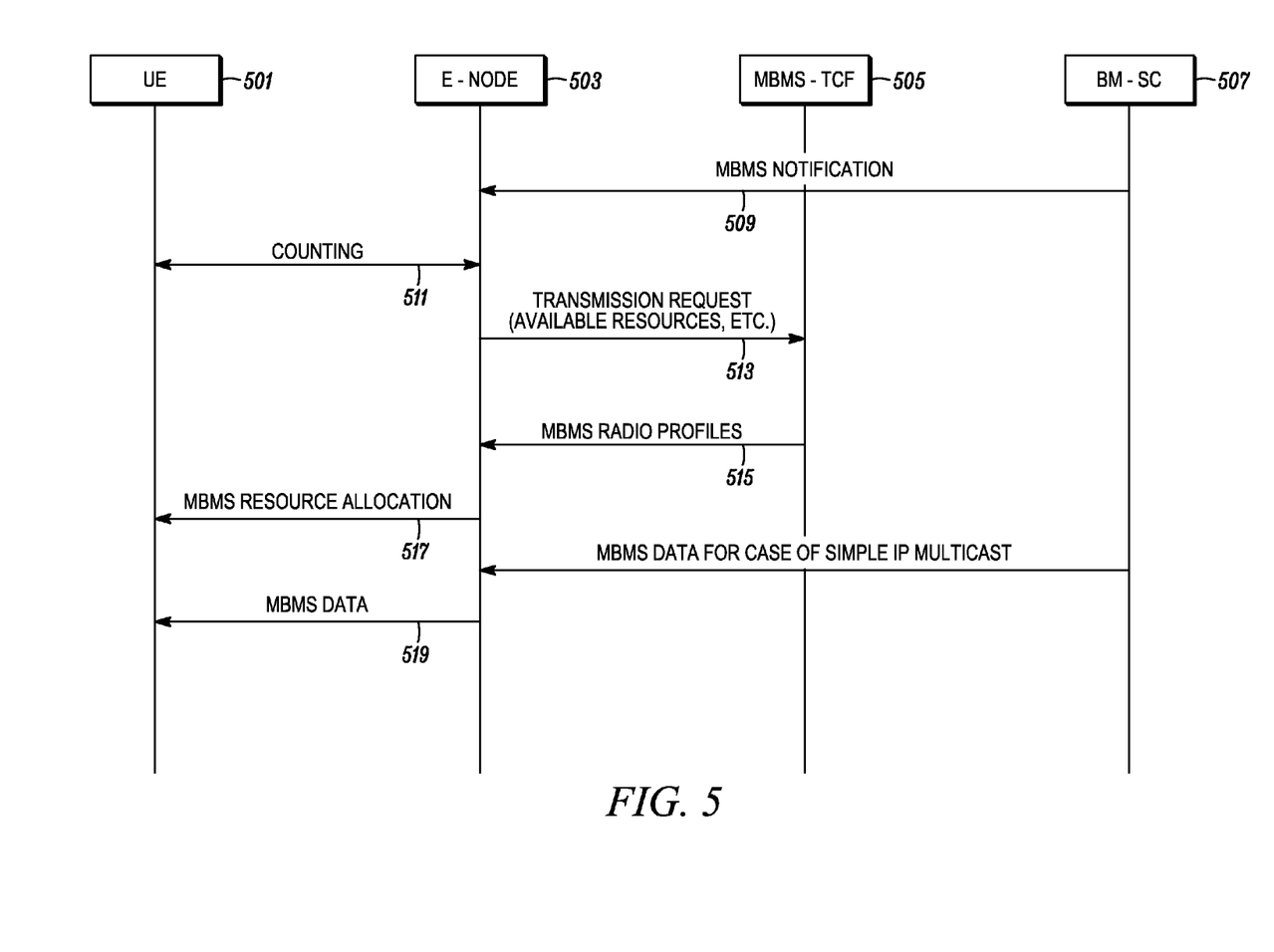
FIG. 5 is a signal flow diagram illustrating a high level operation of a network in accordance with the embodiments.

In the various embodiments, the MBMS-TCF provides resource allocation and scheduling profiles for MBMS service to each cell and also provides a segmentation and reassembly (SAR) profile. FIG. 5 is a signal flow diagram illustrating high level operation related to the MBMS-TCF in accordance with the various embodiments.

In FIG. 5, BM-SC 507 may send an MBMS notification 509 to the various E-nodes such as E-Node 503. The notification 509 may comprise a service identifier corresponding to the particular provider MBMS, and also a session identifier wherein multiple sessions may be available.

The E-Node 503 will then broadcast a counting request 511 to UE 501 and all UEs within the E-Node 503 radio coverage area. The counting request may comprise a service identifier corresponding to the particular provider MBMS, and also a session identifier in the case of multiple available sessions. The counting request may further include additional information such as an initial probability factor, Temporary Mobile Group Identity (TMGI), session identifier, and further in some embodiments a Signal-to-Noise Ratio (SINR) range. Various counting methods and apparatuses that may be used in conjunction with the various embodiments herein disclosed are described by U.S. patent application Ser. No. 11/286,799 "ADAPTIVE BEARER CONFIGURATION FOR BROADCAST/MULTICAST SERVICE USING RECEIVED RESPONSE INFORMATION" and further by U.S. patent application Ser. No. 11/286801 "ADAPTIVE BEARER CONFIGURATION FOR BROADCAST/MULTICAST SERVICE," both of which are assigned to Motorola, Inc. and both of which are hereby incorporated by reference herein.

Therefore in some embodiments, a "0-1" counting may be applied wherein the E-Node need not differentiate between users. In this case, the E-Node only needs to determine whether any mobile stations are within the cell that are subscribed to MBMS and, in some embodiments also whether the mobile stations have not previously received the offered MBMS transmission. For example, a counting request from the base station may comprise a service identifier corresponding to the particular provider MBMS, and also a session identifier wherein multiple sessions may be available. If a mobile station is subscribed to MBMS as determined by the service identifier, but has not received the current session as determined by the session identifier, the mobile station may indicate that it wants to receive the offered session. Counting requests that differentiate between various users may be used in the various embodiments alternatively, or in combination with various E-Nodes that use 0-1 counting and various E-Nodes that use other counting approaches. Therefore, any counting technique may be used and remain within the scope of the various embodiments herein disclosed.

Returning to FIG. 5, the E-Node 503 sends its transmission request 513 to the anchor, which is handled by the anchor MBMS-TCF 505. The anchor MBMS-TCF 505 generates a transmission tree structure having the E-Nodes as leaves, and thereby creates resource and scheduling profiles, and segmentation and reassembly (SAR) profiles for the E-Node 503, and other E-Nodes commonly connected to the anchor MBMS-TCF 505. The MBMS profiles 515 are then sent to the E-Node 503. The E-Node 503 may then allocate MBMS resources 517, establish a Point-to-Multipoint (PTM) Radio Bearer (RB), and begin MBMS data transmission 519. The MBMS resources may be, for example, one or more OFDM sub-carriers.

Figure 6:
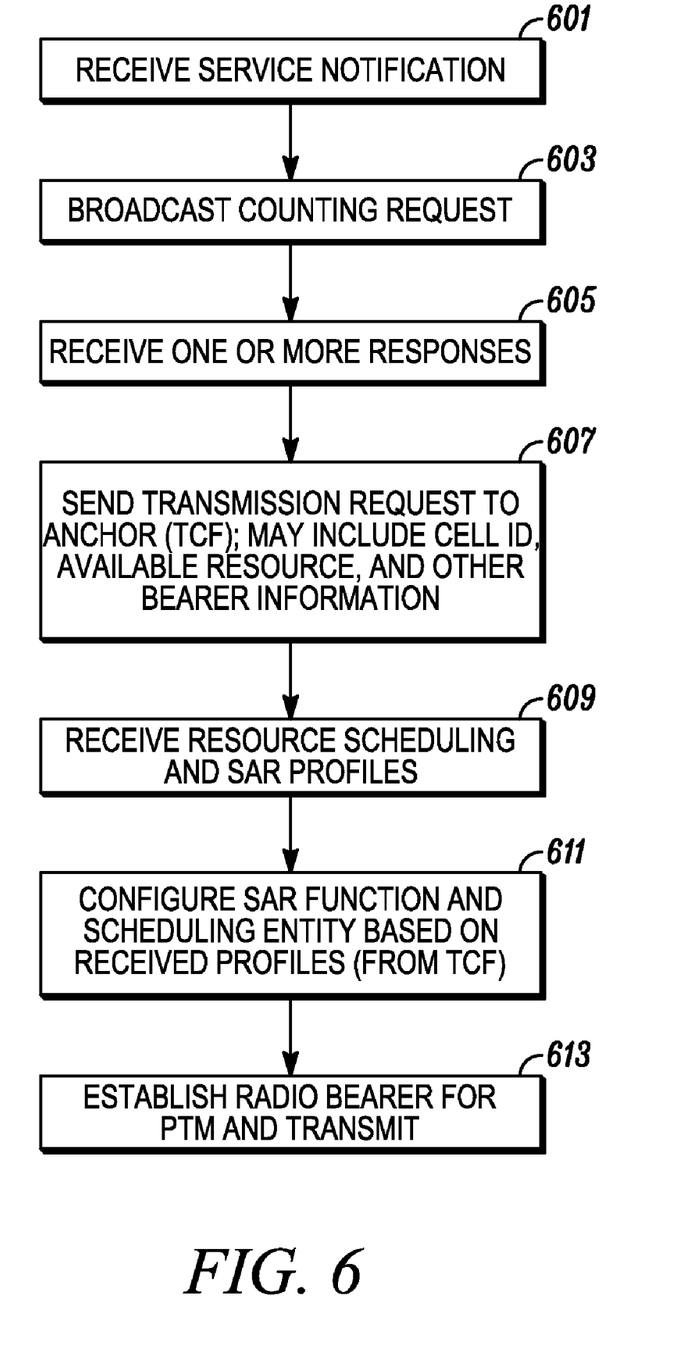
FIG. 6 is a flow chart illustrating a method of operation of a base station in accordance with an embodiment.

FIG. 6 illustrates the E-Node operation in accordance with an embodiment. The E-Node receives the BM-SC service notification in block 601, and broadcasts a counting request 603 to all UEs within its radio coverage area. Any UE that wants to receive the MBMS broadcast will join the counting procedure as shown in block 605. It is to be understood that if no UE responds to the counting the procedure halts and no PTM RB may be established for MBMS from that particular E-Node.

However, assuming that at least one response was received in response to the counting request, as shown in block 605, the E-Node MBMS-TCF will send the transmission request to the anchor TCF as shown in block 607.

In response, the anchor TCF will send a resource scheduling profile and a SAR profile to the E-Node as shown in block 609. The E-Node will then configure its SAR function and scheduling entity based on the received profiles as shown in block 611. In block 613, the E-Node established a PTM RB and transmits.

Figure 7:
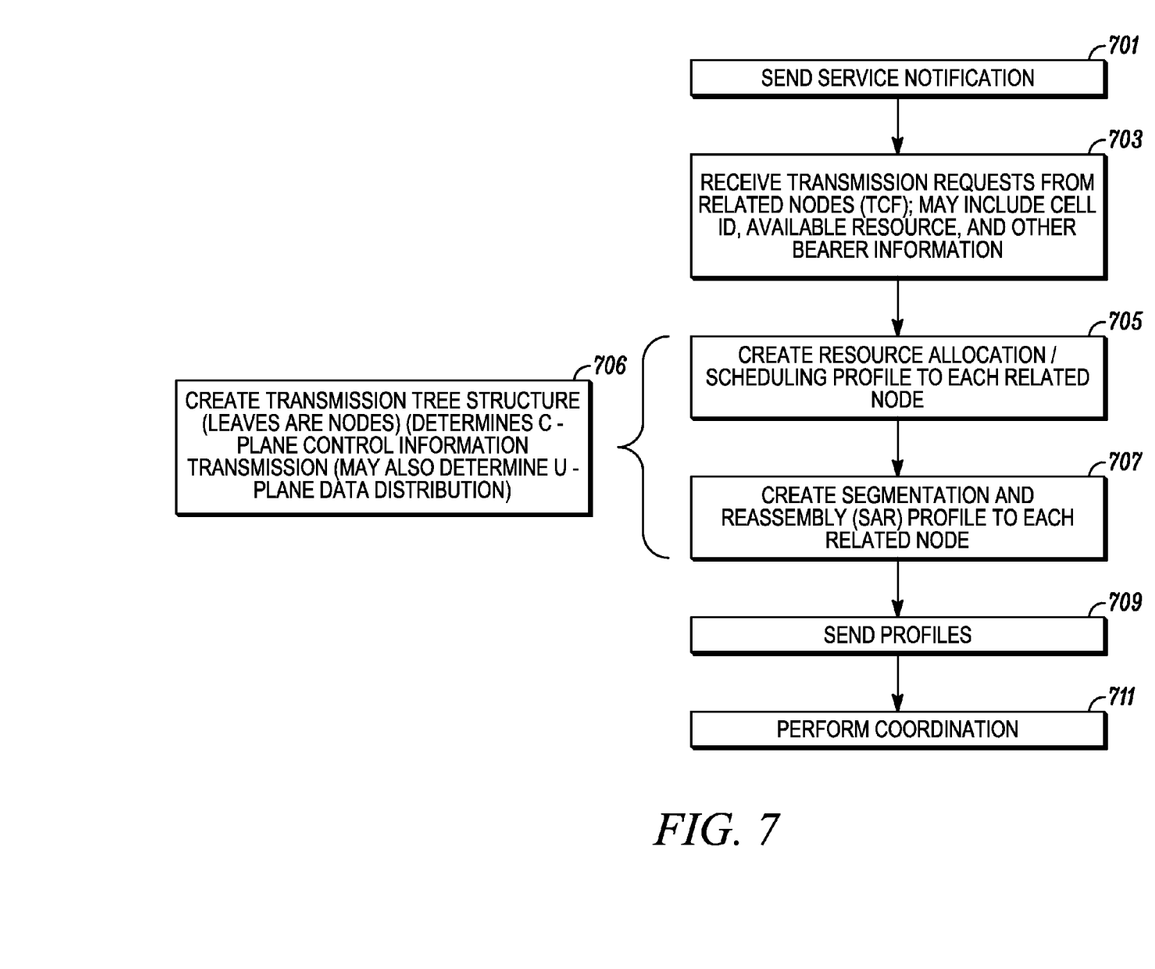
FIG. 7 is a flow chart illustrating a method of operation of an anchor in accordance with an embodiment.

Turning now to FIG. 7, operation of an anchor is illustrated in accordance with an embodiment. In block 701 service notification is sent to all E-Nodes connected to the anchor. The anchor TCF receives the various E-Node transmission requests from E-Nodes having interested UEs. The transmission requests may included cell ID, available resource and other bearer information.

In blocks 705 and 706 the anchor TCF creates resource allocation and scheduling profiles and SAR profiles for each E-Node having interested UEs. Block 706 shows additional details of some embodiments, which involves creating a transmission tree structure wherein the connected E-Nodes are the leaves of the tree. This structure determines control plane (C-plane) control information transmission and may determine user plane (U-plane) data distribution in some embodiments.

To accommodate soft combining by the UEs, the resource allocation will allocate identical OFDM tones (subcarriers) wherever possible based on availability. For scheduling, the resource may be arranged into the MBMS super-frame structure where each frame contains multiple Transmission Timing Intervals (TTIs). The MBMS-TCF may allocate the start TTI index and end TTI index per MBMS super-frame for each service. Buffering may be used as required to smooth the MBMS traffic. The SAR information may include a segmentation option, Protocol Data Unit (PDU) size, padding option, etc., and may be provided to the anchor TCF in the combing request message. The MBMS-TCF may then determine the best SAR profile for the particular service.

The anchor TCF sends the profiles to the various E-Nodes as shown in block 709 and performs coordination as shown in block 711. Note that if an E-Node that did not join in MBMS transmission needs to transmit later, that is, if a UE interested in the transmission enters the E-Node coverage area, the UE may request a Point-to-point (PTP) RB and receive the transmission via PTP. If MBMS PTM is already occurring and a UE subsequently enters the coverage area, a Multicast Control Channel (MCCH) will inform the UE of the ongoing service. The E-Node will send counting requests periodically for available services that may be ongoing. The E-Node may send a combing request at any subsequent time. The anchor MBMS-TCF may update the transmission tree and update the profiles in some embodiments, and subsequently transmit profiles to the newly added E-Node.

Figure 8:
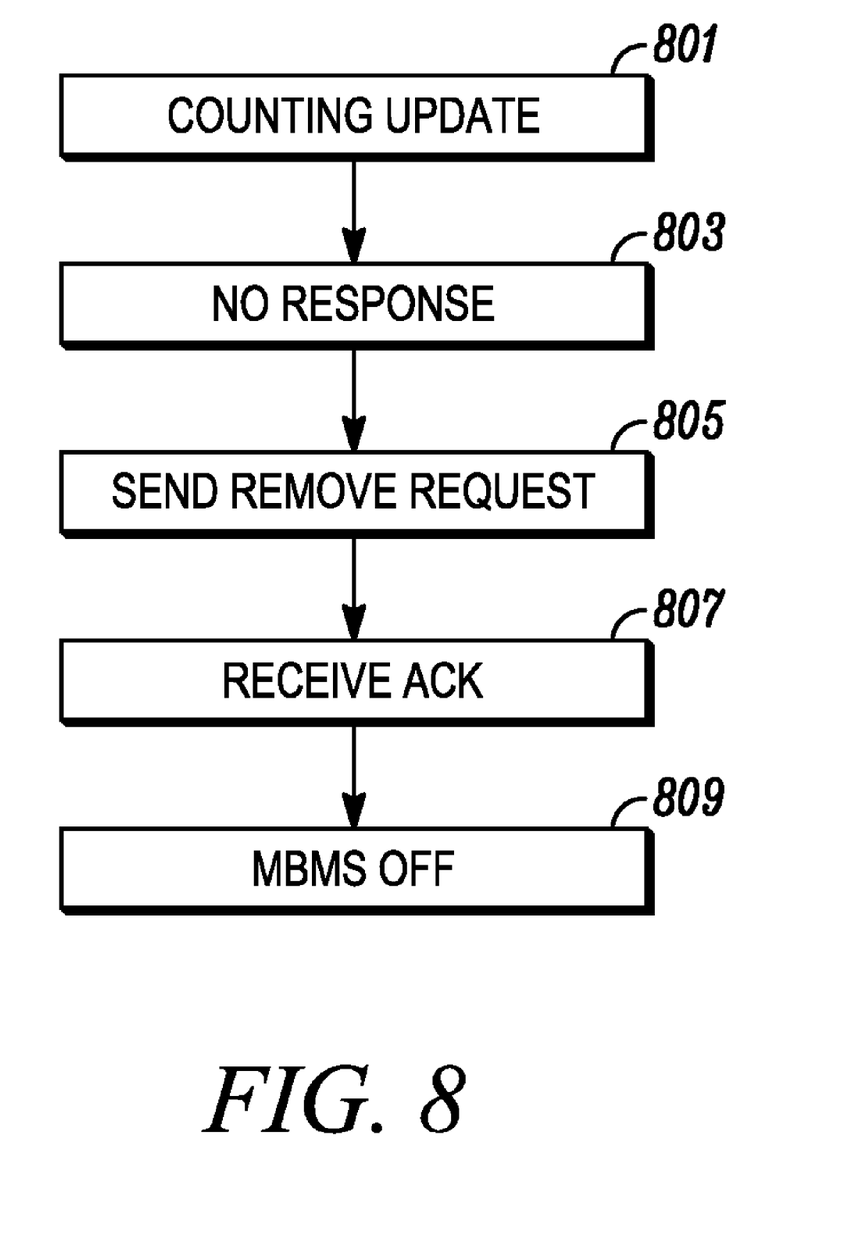
FIG. 8 is a flow chart illustrating a method of operation of a base station in accordance with some embodiments.

When all UEs move out of a E-Node coverage area, the E-Node may turn off MBMS transmission. This case is illustrated by FIG. 8 for the various embodiments. After the interested UEs leave the E-Node coverage area, the E-Node will conduct a counting as shown in block 801. If no response is received as shown in block 803, the E-Node will send a remove request to the anchor TCF as shown in block 805. The anchor TCF will update the transmission tree structure appropriately. After receiving an acknowledgement in block 807 the E-Node may turn off MBMS transmission as shown in block 809.

While the preferred embodiments have been illustrated and described, it is to be understood that the disclosure is not so limited. Numerous modifications, changes, variations, substitutions and equivalents will occur to those skilled in the art without departing from the spirit and scope of the present invention as defined by the appended claims.

What is claimed is:

1. A method of operating a wireless communications network infrastructure entity comprising:
   receiving, by said wireless communications network infrastructure entity, available resource information in a transmission request from each base transceiver station of a plurality of base transceiver stations, said transmission request being in response to a multimedia broadcast multicast service notification from said wireless communication network infrastructure entity;
   creating, by a multimedia broadcast multicast transmission control function of said wireless communication network infrastructure entity, a resource allocation and scheduling profile for said plurality of base transceiver stations based on said available resource information;
   creating, by said wireless communications network infrastructure entity, a segmentation and reassembly profile and sending said segmentation and reassembly profile to said plurality of base transceiver stations; and
   sending, by said wireless communications network infrastructure entity, said resource allocation and scheduling profile to said plurality of base transceiver stations.

2. The method of claim 1, wherein the step of creating a resource allocation and scheduling profile further comprises;
   allocating a start Transmission Timing Interval (TTI) index and an end Transmission Timing Interval index in accordance with a transmission superframe.

3. The method of claim 1, wherein the step of creating a segmentation and reassembly profile further comprises:
   providing a segmentation option, a Protocol Data Unit (PDU) size, and a padding option.

4. The method of claim 1, wherein said resource allocation and scheduling profile allocates an identical radio subcarrier to said plurality of base transceiver stations.

5. The method of claim 1 wherein receiving the available resource information in a transmission request from each base transceiver station of a plurality of base transceiver stations includes receiving information indicating which user entities in a base transceiver station coverage area desire multimedia broadcast multicast service based on counting request broadcasts by a base transceiver station to user entities within the base transceiver station radio coverage area.

6. The method of claim 1 further comprising as part of the resource allocation, allocating identical subcarriers to base transceiver stations to facilitate soft combining of information by user entities in the coverage area.

7. A network anchor entity comprising:
a transceiver; and
a controller coupled to said transceiver, configured to:
   receive available resource information in a multimedia broadcast or multicast service transmission request from at least one base transceiver station of a plurality of base transceiver stations, in response to a multimedia broadcast multicast service notification from said network anchor entity;
   create a multimedia broadcast multicast service resource allocation and scheduling profile for said plurality of base transceiver stations based on said available resource information;
   wherein said controller is further configured to create a segmentation and reassembly profile and send said segmentation and reassembly profile to said plurality of base transceiver stations; and
   send said multimedia broadcast multicast service resource allocation and scheduling profile to said plurality of base transceiver stations.

8. The network anchor entity of claim 7, wherein said controller is further configured to determine and send a start TTI index and an end TTI index in accordance with a transmission superframe.

9. The network anchor entity of claim 7, wherein said controller is further configured to send a segmentation option, a Protocol Data Unit (PDU) size, and a padding option.

10. A multimedia broadcast multicast service anchor entity comprising:
a multimedia multicast broadcast service transmission control function operative to:
   generate a transmission tree structure having a plurality of base transceiver stations as leaves of said tree structure and create corresponding resource and scheduling profiles and segmentation and reassembly profiles for each leaf of said transmission tree structure based on received available resource information and bearer information received from said plurality of base transceiver stations sent in response to a multimedia broadcast multicast service notification from said anchor entity; and
send said resource and scheduling profiles and segmentation and reassembly profiles to said plurality of base transceiver stations.

11. A wireless communication network comprising:
an anchor entity comprising:
   a multimedia multicast broadcast service transmission control function operative to:
   generate a transmission tree structure having a plurality of base transceiver stations as leaves of said tree structure and create corresponding resource and scheduling profiles and segmentation and reassembly profiles for each leaf of said transmission tree structure based on received available resource information and bearer information received from said plurality of base transceiver stations sent in response to a multimedia broadcast multicast service notification from said anchor entity, and
   send said resource and scheduling profiles and segmentation and reassembly profiles to said plurality of base transceiver stations; and
a plurality of base transceiver stations coupled to said anchor entity, each base transceiver station operative to:
send said available resource information and bearer information received from said plurality of base transceiver stations sent in response to said multimedia broadcast multicast service configure segmentation and reassembly and configure a scheduling entity based on said resource and scheduling profiles and segmentation and reassembly profiles from said anchor entity.

* * * * *